(12) United States Patent
Hoag et al.

(10) Patent No.: US 11,645,701 B2
(45) Date of Patent: May 9, 2023

(54) METHOD, MEDIUM, AND SYSTEM FOR A RULES ENGINE, SUCH AS FOR PURCHASE REQUEST MANAGEMENT

(71) Applicant: Teampay, Inc., New York, NY (US)

(72) Inventors: Andrew Hoag, New York, NY (US); Justin Oblak, New York, NY (US)

(73) Assignee: Team Labs, Inc., New York, NY (US)

( * ) Notice: Subject to any disclaimer, the term of this patent is extended or adjusted under 35 U.S.C. 154(b) by 288 days.

(21) Appl. No.: 17/218,077

(22) Filed: Mar. 30, 2021

(65) Prior Publication Data

US 2021/0304287 A1    Sep. 30, 2021

Related U.S. Application Data

(60) Provisional application No. 63/003,032, filed on Mar. 31, 2020.

(51) Int. Cl.
*G06Q 30/00* (2023.01)
*G06Q 30/0601* (2023.01)
*H04L 51/02* (2022.01)

(52) U.S. Cl.
CPC ......... *G06Q 30/0637* (2013.01); *H04L 51/02* (2013.01)

(58) Field of Classification Search
CPC ............................. G06Q 30/0637; H04L 51/02
See application file for complete search history.

(56) References Cited

U.S. PATENT DOCUMENTS

| | | | | |
|---|---|---|---|---|
| 5,319,542 A | * | 6/1994 | King, Jr. | G06Q 30/0635 705/26.81 |
| 7,082,408 B1 | * | 7/2006 | Baumann | G06Q 30/0633 705/28 |
| 8,286,863 B1 | * | 10/2012 | Brooks | G06Q 20/355 235/487 |
| 8,978,978 B2 | * | 3/2015 | Mitchem | G06Q 30/06 235/383 |
| 9,852,466 B2 | * | 12/2017 | Escobar Olmos | G06Q 30/0637 |
| 2003/0212629 A1 | * | 11/2003 | King | G07F 7/08 705/39 |
| 2005/0251409 A1 | * | 11/2005 | Johnson | G06Q 30/02 705/343 |

(Continued)

OTHER PUBLICATIONS

Parmelee, Alan B. "Streamlining the accounts payable purchase order procedure and approval process." (2000). (Year: 2000).*

*Primary Examiner* — Matthew E Zimmerman
(74) *Attorney, Agent, or Firm* — Perkins Coie LLP

(57) ABSTRACT

Systems and methods for managing purchases for an organization using a rules engine are disclosed. A purchasing system receives a purchase request message and extracts purchase order information associated with a request to make a purchase. Using the extracted purchase order information, a purchase order object is generated. Based at least in part on the purchase order information, a set of rules applicable to the purchase order object is identified, the rules including at least one condition and at least one action. The set of rules can also be identified based in part on contextual information. The at least one action is applied to the purchase order object. Upon receiving authorization from an approval entity, a digital credit object is generated to fulfill the purchase request and the digital credit object is provided to the user.

20 Claims, 15 Drawing Sheets

(56) References Cited

U.S. PATENT DOCUMENTS

| | | | |
|---|---|---|---|
| 2011/0191209 A1* | 8/2011 | Gould | G06Q 30/0637 705/26.82 |
| 2014/0279279 A1* | 9/2014 | Wilman Rego | G06Q 30/0637 705/26.82 |
| 2017/0270596 A1* | 9/2017 | Nagalkar | G06Q 30/0637 |

* cited by examiner

| DATE | TOKEN ID | VENDOR | CATEGORY | AMOUNT | TYPE | CONTACT | DESCRIPTION |
|---|---|---|---|---|---|---|---|
| 01.12 | 1123 1223 1223 1234 | AMAZON | SUPPLIES | $34.99 | ONE TIME | JUSTIN | OFFICE SUPPLIES |
| 01.12 | 1123 1223 1223 1235 | APPLE | COMPUTER | $999.00 | ONE TIME | ANDREW | LAPTOP FOR NEW DEVELOPER |
| 01.13 | 1123 1223 1223 1236 | APPLE | COMPUTER | $119.00 | ONE TIME | ANDREW | MOUSE AND KEYBOARD |
| 01.15 | 1123 1223 1223 1237 | DOCSEND | SOFTWARE | $15.00 | RECURRING | JUSTIN | DOC TRACKING SERVICE |
| 01.17 | 1123 1223 1223 1238 | AMAZON | GIFT | $45.99 | ONE TIME | ANDREW | WINE FOR NEW CLIENT |

METHOD, MEDIUM, AND SYSTEM FOR A RULES ENGINE, SUCH AS FOR PURCHASE REQUEST MANAGEMENT

CROSS-REFERENCE TO RELATED APPLICATION

This application claims priority to the assignee's U.S. Provisional Patent Application No. 63/003,032, filed on Mar. 31, 2020, entitled RULES ENGINE, which is incorporated herein by reference in its entirety.

BACKGROUND

Purchasing departments in companies and other organizations handle many different tasks—from provisioning supplies to authorizing purchases of computing and other infrastructure resources. These tasks may be simple or complex, but often have associated procedures that employees follow to initiate and complete a purchase. For example, an employee may fill out various order forms and approval documentation before submitting a request for an item, service, or other expenditure.

Further, organizations may have and/or apply a complex set of rules to such processes. The rules may identify, among other things, the level of authorization assigned to an employee or group, the types of purchases, budgets or general approval processes, and so on. As an organization grows, its ability to track and efficiently manage the many different ongoing processes may decrease, leading to inefficiencies of workflows, poor utilization of its internal resources, and costlier operations, among other drawbacks.

Therefore, it would be advantageous to an organization, company, or entity to have access to an efficient and simplified system that manages its internal purchasing operations.

BRIEF DESCRIPTION OF THE DRAWINGS

Embodiments of the present technology will be described and explained through the use of the accompanying drawings.

FIG. 5 is a diagram illustrating an example user interface that presents a view of transactions performed via the purchasing system.

FIGS. 6 to 14 illustrate example user interfaces presented by the rules engine.

Figure 1A:
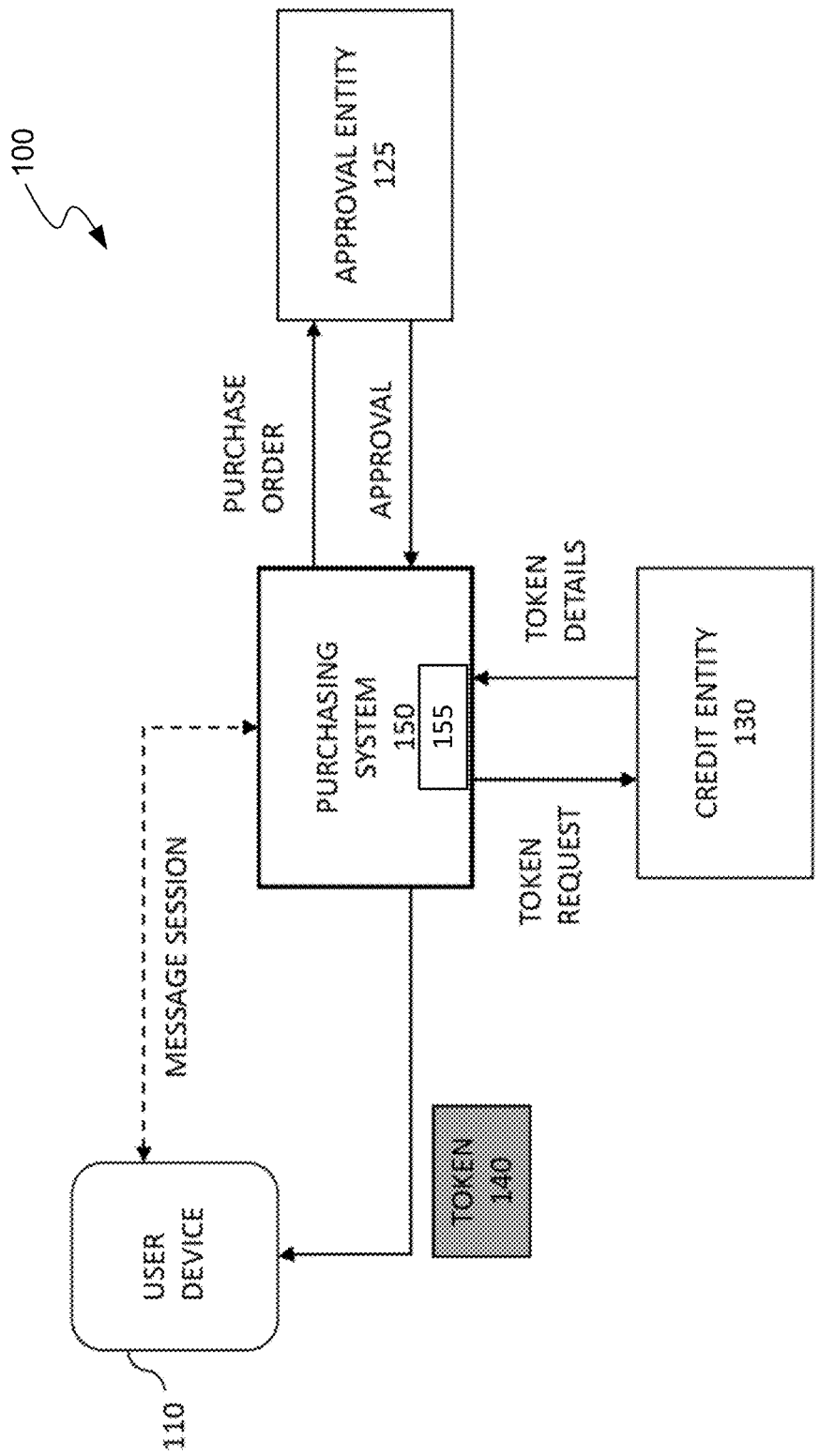
FIGS. 1A-1B are block diagrams illustrating a suitable computing environment for managing purchase order operations for an organization.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Overview

Systems and methods are described herein for managing purchase orders within an organization, such as a company, entity, or other business or group of individuals, based on rules created using a rules engine. The systems and methods may identify order requests from internal messaging or collaboration systems. Once order requests are identified, the systems and methods identify rules to apply to the requests, such as rules defining a process for approval or disapproval of the requests. Based on the applied rules, the systems and methods can approve or disapprove the requests. The systems and methods can then determine, generate, or create purchase orders based on approved requests, and generate tokens (e.g., virtual credit cards) specific to a purchase order, to be used by the requestor to complete the purchase of requested items or services. Once the tokens are used, the systems and methods may then track the purchases in various databases, providing the organization with various views or insights into their employees' expenditures.

For example, in some embodiments the systems and methods manage purchasing operations for an organization by accessing one or more messages associated with an employee of an organization, where, in some cases, the one or more messages are sent between the employee and a virtual bot associated with a purchasing system. The systems and methods parse and/or extract purchase order information associated with a request from the employee to purchase an item or service, and identify rules to apply to the request. Based on the applied rules, the systems and methods can determine approval or disapproval of the request. If the request is approved, the systems and methods generate a purchase order object using the extracted purchase order information, which may include parameters for the request to purchase the item or service.

Upon receiving authorization for the purchase order object (or, automatically authorizing the purchase), the systems and methods generate a token specific to the purchase order object (e.g., a virtual credit card), which may be configured to be utilized by the employee to purchase the requested item or service, and provide the generated token to the employee of the organization.

Thus, in some embodiments, the systems and methods access messages associated with an employee of the organization, parse the accessed messages to identify parameters for a purchase order associated with purchasing an item for the employee, apply identified rules to the purchase order, and generate a token that is specific to the identified parameters for the purchase order, which may then be used by the employee when purchasing the item (or service) or otherwise making an approved expenditure.

The systems and methods, therefore, may generate or create tokens unique to specific or individual purchases of items or services, such as supplies, computing devices, software or online services, and/or other expenditures requested by employees to assist them in performing their tasks as employees and/or running aspects of the organization.

As an example, the systems and methods may simplify complex accounting procedures for certain purchases, such as costs associated with legal or regulatory filings to courts, agencies, and so on. By assigning or issuing multiple, unique tokens to the purchases, the systems and methods track both the account of the purchase (in the accounting system, what ledger account) as well as additional cost dimensions, such as client ID, project code, office location, and so on. More complex organizations use many dimensions to categorize an expense in their accounting system. In issuing two different tokens with different categorization and client data for the purchases, the systems and methods automatically assign the purchase costs to the right accounts (which could be many), avoiding complexity of categorization, among other benefits.

The systems and methods can also simplify complex approval processes for purchases by allowing an organization to configure rules applicable to purchase orders. For example, the systems and methods can allow a user to configure rules for approval or disapproval of purchase requests based on a requested amount, a requestor, a location, a vendor, an approval group, an item or service requested, a category of expenditure, a department associated with a requestor, or any other parameter or characteristic associated with a purchase request or requestor. Based on an applied rule, a request can be automatically approved, automatically disapproved, assigned to one or more approvers, and/or routed to a different review and approval process, such as a process performed via a third-party system (e.g., via a software application) or website. A rule can also be associated with alerts or notices, such as causing an alert to be sent to a requestor that a purchase request is approved or denied, or causing an alert to be sent to an approver about a purchase request.

In a way, the systems and methods relate to technology that may augment, enhance, or simply replace an organization's purchasing department. The technology frees up organization resources and provides efficient processes for authorizing purchases, tracking transactions, and managing internal operations, among other benefits.

Further, in generating tokens for purchase orders that are unique and/or specific to underlying purchase orders associated with the tokens, and tracking purchases and other operations associated with the tokens, the systems and methods enable organizations to create new and enhanced databases of transactions.

These databases may store information relating to the token, specific credit card, virtual currency (e.g., smart or other electronic contracts, such as bid contracts), and so on used to purchase an item along with purchase orders and other metadata associated with the purchase. Databases can also store information about rules applied to a purchase request, such as a list of approvers, an action applied to a purchase request (e.g., auto-approve, auto-deny, assign approver, etc.), and purchase order information or contextual information that is used to apply specific rules to the request. An organization, therefore, may utilize such a database to identify recurrences in purchase order requests, determine trends in costs or purchases, track expenditures at individual, team, class, group, or other organization hierarchy levels, track approvals or disapprovals, and so on.

The systems and methods described herein, therefore, provide an organization with a simplified, efficient mechanism for controlling purchases within an organization, from an initial request (or discussion about a request), through approval or disapproval of a request, and purchase and receipt of requested goods or services, among other benefits.

Further, in some embodiments, the systems and methods described herein facilitate the encoding of nearly anything a user says into an underlying workflow rule. In other words, the systems and methods enable rules to be configured that are then applied to purchase requests based on purchase order information in the requests. In addition to purchase order information, rules can be applied based on contextual information, such as information about an employee or other requestor, history of previous requests, or information from external sources (e.g., other systems or third-party sources). Thus, the request received from the user can be mapped to one or more rules governing how the request is processed.

In the following description, for the purposes of explanation, numerous specific details are set forth in order to provide a thorough understanding of embodiments of the present technology. It will be apparent, however, that embodiments of the present technology may be practiced without some of these specific details.

Examples of a Suitable Network Environment

Systems and methods for managing purchase orders for an organization, generated from initial requests through purchase tracking and management, are described. FIG. 1A depicts an example flow of operations 100 when managing and controlling purchase orders for an organization.

As shown, a user device 110 associated with a user (e.g., an employee of the organization) exchanges messages with the organization, such as email messages, chat or instant messages, messages within a collaboration tool (e.g., Slack), and so on. A purchasing system 150, which may include or perform the systems and methods described herein, may access the various messages and/or interact with the user by exchanging messages.

During the exchange of messages, the purchasing system 150 identifies that the user wishes to purchase an item. The system 150 may determine that the user associated with device 110 would like to purchase a toner cartridge for his printer, and extract from the messages, parameters for the request to use in generating a purchase order. For example, the system may extract (or receive) information identifying the type of toner, a vendor for the toner, a cost of the toner cartridge, a delivery preference (or date needed), among other information.

Using the extracted information, the system 150 generates a purchase order object, and sends the purchase order object to an approval entity 125 of the organization, such as an authorized employee (e.g., a group or human resources manager), an automated system, or other entities or systems capable of authorizing and/or approving purchase orders, when applicable. The system 150 can identify the approval entity 125 based on a set of rules configured using a rules engine 155 associated with the system 150, as described herein.

Once authorization is received, the system 150 sends a request to a credit entity 130 (e.g., an associated bank or financial institution) to receive a token or virtual currency (coin, smart contract, bid contract, and so on) to be used by the employee to purchase the toner cartridge. The credit entity 130, in response to the request may issue credit to the system 150, which then generates a token 140 (e.g. a credit card number, an amount of virtual currency/crypto-currency, a code (e.g., contract ID code), and so on) that is representative of the issued credit and is specific to the requested item for purchase (e.g., the toner). The token 140 can be a digital credit object such as a virtual credit card or prepaid card (e.g., debit or gift card), a currency (including digital or cryptocurrency), a purchase order, or any other object representative of a means of payment, and can further be configurable in various ways, such as by including metadata about the object and/or the request, which may restrict use of the digital credit object to approved purchases or vendors or otherwise enforce rules applicable to the digital credit object.

The system 150 then provides the generated token 140 to the user device 110, and the user purchases the toner cartridge using the token via a vendor. The system 150 may track use of the token 140, and update a database of transactions to include an entry that identifies the toner cartridge purchase, the token 140 used for the purchase, the employee that purchased the toner cartridge, and other information.

Figure 1B:
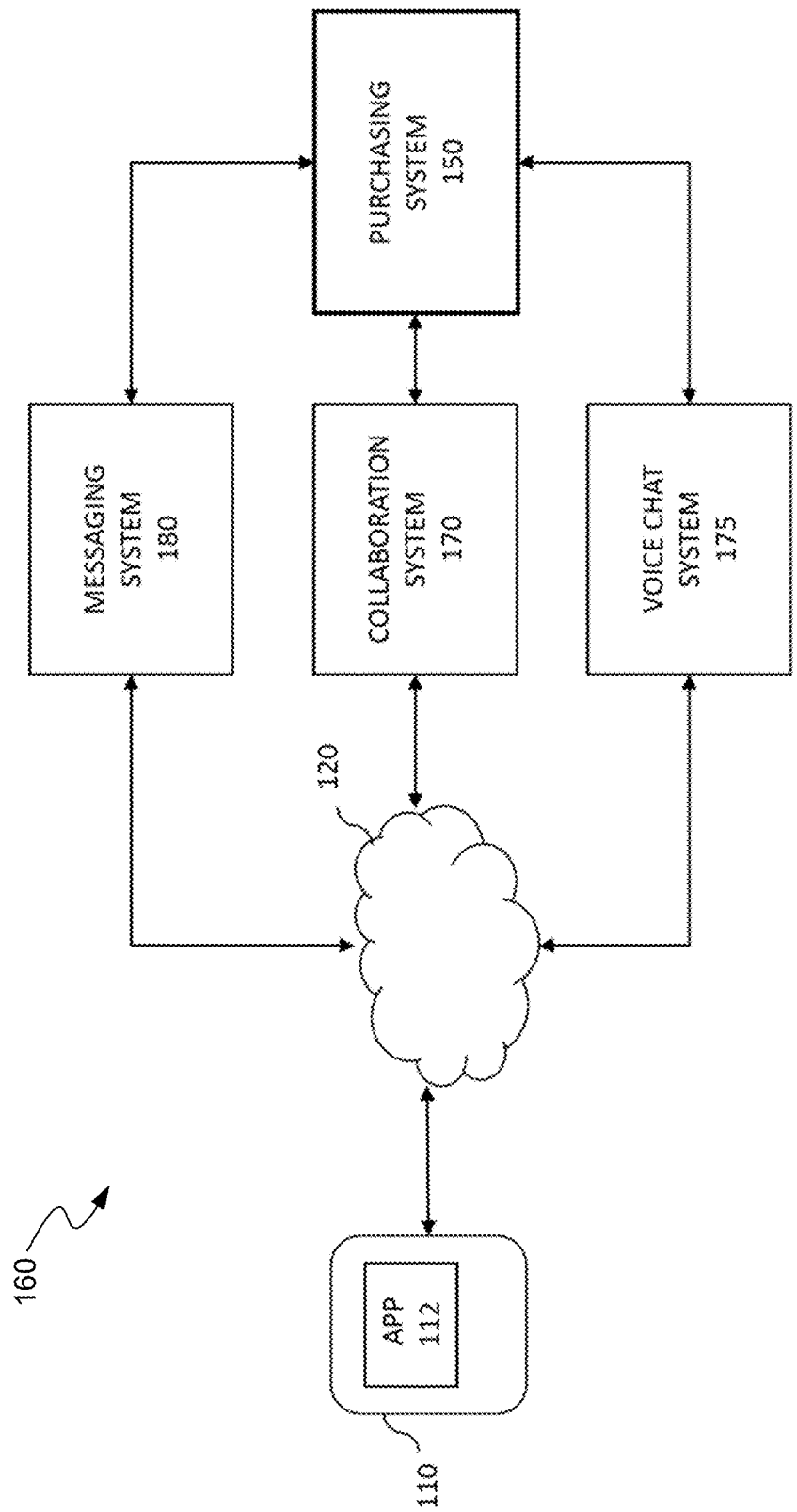

FIG. 1B depicts a suitable computing environment 160 for managing purchase order operations for an organization. As described in FIG. 1A, a user device 110, such as a laptop, mobile device, or other computing device, may exchange messages over a network 120 with the purchasing system 150, via one or more messaging systems or protocols.

As shown, the purchasing system 150 may access communications within a collaboration system, tool, or service 170, such as Slack or various organization intranet services. For example, the system 150 may utilize a virtual chat bot configured to exchange messages with employees within the collaboration tool platform and parse or extract purchase order information or other order requests from the messages.

The system 150 may also access other communication systems or protocols, such as voice chat systems 175 and/or messaging systems 180, such as email systems, text message systems, and so on. For example, the system 150 may provide an IP address, username (e.g., "@hr_ordering"), phone number, dedicated device (e.g., a voice communications device, such as the Amazon Echo), and so on, and interact with users via messages or voice communications.

The purchasing system 150, therefore, identifies or receives user purchase requests by interacting with users and parsing messages from the interactions or conversations for information or parameters related to the purchase requests. As will be described in further detail here, the system 150 is configured to then generate purchase orders (or other similar objects) from the messages, apply rules to the generated purchase orders, and provide tokens and other virtual currency or credit objects to users when making purchases, among other things.

The user device 110 may be a tablet computer, mobile device, smart-phone, net-book, mobile GPS navigation device, voice controlled device, or any other device that supports, presents, and/or displays apps or programs via a user interface, such as a touch-screen, of the device. The user device 110 may include various hardware and/or software components in order to provide such functionality. For example, the user device 110 may include various human interface components, processing components, device components, memory, voice recognition components, and so on.

The network 120 may be a Local Area Network (LAN), a Wide Area Network (WAN), the Internet, various different telecommunication networks (4G, LTE, and so on), or other networks capable of facilitating various communications between computing devices.

FIGS. 1A-1B and the discussion herein provide a brief, general description of a suitable computing environment in which the purchasing system 150 can be supported and implemented. Although not required, aspects of the system are described in the general context of computer-executable instructions, such as routines executed by a general-purpose computer, e.g., mobile device, a server computer, or personal computer. Those skilled in the relevant art will appreciate that the system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, voice-controlled devices, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible computer-readable storage media, such as non-transitory media), including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks) or they may be provided on any analog or digital network (packet switched, circuit switched, or other scheme). Those skilled in the relevant art will recognize that portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

Any of the machines, databases, or devices shown in FIGS. 1A-1B may be implemented in a general-purpose computer modified (e.g., configured or programmed) by software to be a special-purpose computer to perform the functions described herein for that machine, database, or device. For example, a computer system able to implement any one or more of the methodologies described herein. Moreover, any two or more of the machines, databases, or devices illustrated in FIG. 1 may be combined into a single machine, and the functions described herein for any single machine, database, or device may be subdivided among multiple machines, databases, or devices.

Examples of Managing Purchase Order Operations for an Organization

As described herein, the systems and methods control purchase order operations for various organizations, such as companies of all sizes (e.g., companies of 50 employees or larger, where at least some resources are generally dedicated to handling purchase orders and other employee requests for goods, supplies, items, or services).

Figure 2:
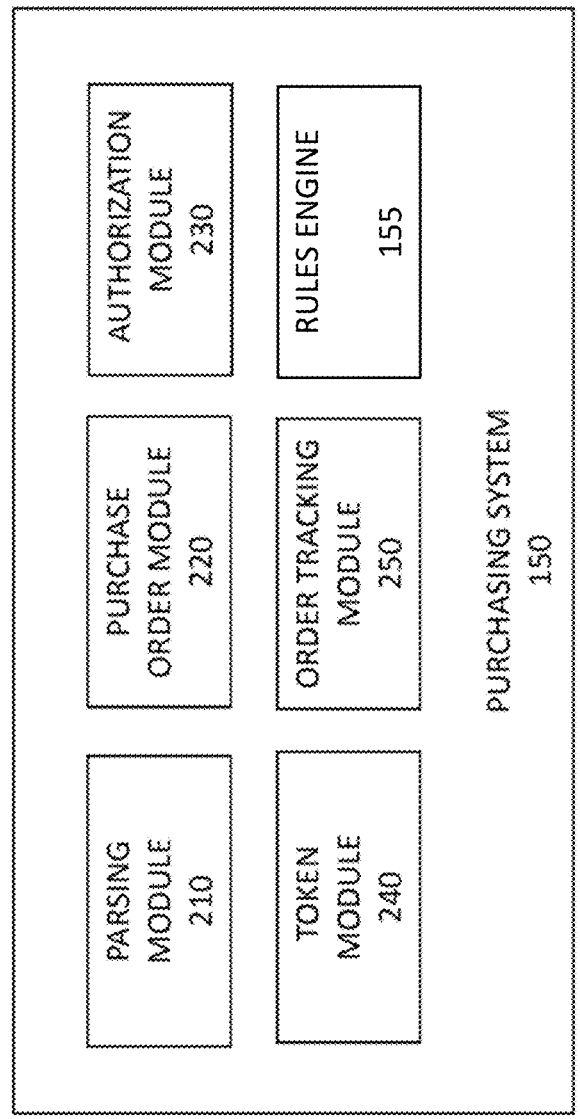
FIG. 2 is a block diagram illustrating components of a purchasing system configured to manage purchase orders within an organization.

FIG. 2 is a block diagram illustrating components of the purchasing system 150, which may be configured to manage purchase orders within an organization. The purchasing system 150 may include one or more modules and/or components to perform one or more operations of the purchasing system 150. The modules may be hardware, software, or a combination of hardware and software, and may be executed by one or more processors. For example, the purchasing system 150 may include a parsing module 210 (or, extraction module), a purchase order module 220, an authorization module 230, a token module 240, an order tracking module 250, and the rules engine 155.

In some embodiments, the parsing module 210 is configured and/or programmed to access one or more messages associated with an employee of an organization and extract, from the accessed one or more messages, purchase order information associated with a request from the employee to purchase an item or service. In some implementations, the request need not be specific to an item or service, and can instead be for types or categories of expenditures (e.g., general office supplies, general food and beverages, etc.), or unrestricted expenditures (e.g., if below a certain amount, for a certain requestor, etc.). For example, the parsing module 210 parses messages or other plain text to identify a description of the item or service, a vendor providing the item or service, and an amount to purchase the item or service, from the messages.

The parsing module 210 may follow a parsing tree or other schema when parsing messages, in order to identify words or phrases that are indicative or associated with a description, vendor, price, amount, quantity, and so on. For example, given a set of messages of "I'd like to get a new monitor for each member of my team" followed by "the Apple 20 inch costs 289 sold on Amazon, and I need four of them," the parsing module 210 extracts the following purchase order information:

Item: Apple 20 inch monitor (indicated by "like to get");
Price: $289.00 (indicated by "costs");
Vendor: Amazon (indicated by "sold on"); and
Quantity: four (indicated by "I need" and "of them").

As described herein, the system 150, via the parsing module 210, accesses or utilizes various communications systems supporting messaging between employees and other employees and/or virtual bots or assistants. For example, the parsing module 210 may access one or more messages within a conversation supported by a collaboration tool of the organization (e.g., Slack).

As another example, the parsing module 210 accesses the one or more messages within a messaging system of the organization, where the one or more messages are sent between the employee and a virtual bot associated with the messaging system, and parses the one or more messages to identify a description of the item or service, among other information. Example messaging systems or protocols include email applications, messaging application, voice-controlled or voice interaction applications, text messaging applications, instant messaging applications, and so on.

Of course, the purchasing system 150 may access other systems or platforms configured to provide information associated with a purchase order. Browser plugins or extensions (e.g., that send information from web sites viewed by employees), various web or application interfaces (e.g., shopping buttons), order forms, imaging systems (that capture images of products), and so on, may provide information to the system 150 that is sufficient for the system 150 to generate a purchase order (as described herein).

In some embodiments, the purchase order module 220 is configured and/or programmed to generate a purchase order object using the extracted purchase order information. The purchase order object may be a digital purchase order or other data structure, and include parameters for the request to purchase the item or service, such as those extracted by the parsing module 210.

In some embodiments, the authorization module 230 is configured and/or programmed to receive authorization for the purchase order object. For example, the authorization module 230 may submit the purchase order object to the approval entity 125 for approval by an automated approval system or, in some cases, another employee of the organization (e.g., an employee of human resources).

As another example, the authorization module 230 may determine the parameters of the purchase order object indicate a recurrence of the purchase order object being received by the purchasing system 150, and automatically authorize the purchase order object based on the purchase order object being a recurrence of a previously authorized purchase order object within the organization.

The purchasing system 150 may, therefore, be configured to identify recurrences of purchase orders and/or requests (e.g., subscriptions to services), and authorize such requests based on historical approvals or authorizations of similar requests. For example, an organization may perform monthly orders for food or beverages from a vendor, and, in identifying a new order that is similar to at least some of the previous monthly orders, the purchasing system 150 may automatically authorize such orders upon receipt. In some implementations, identifying recurrences of orders and/or requests can be based on one or more defined rules, or the identified recurrences can be used as contextual information used to determine whether a rule is triggered. In some implementations, the purchasing system 150 can identify that an order or request is recurring, but not associated with a rule. Based on the identification of this recurrence, the purchasing system 150 can suggest to a user that a rule be defined to more efficiently process the recurring order or request.

In some cases, the authorization module 230 follows multiple different rules when automatically authorizing a purchase order object. For example, the authorization module 230 may authorize a purchase order based on various different combinations of a price limit, a time of day or day of week, at least one product or service category, a title of the employee or authorized representative, a department in which the employee or authorized representative work within the organization, a number of purchase requests made by the employee or authorized representative within a given time period, whether the requested item or service has been requested previously by the organization, and/or other factors described herein. These rules can be configured using rules engine 155, as described herein.

In some cases, the authorization module 230 may follow other rules or instructions and automatically authorize certain purchase orders. For example, certain employees may be associated with automatic authorizations (e.g., department managers, executives, and so on), orders under certain amounts may be authorized without additional approval, orders with certain vendors may be automatically approved, and so on. The purchasing system 150 may enable an organization to configure or set such rules via the rules engine 155, further providing the organization with control in how purchase orders are handled within the organization.

In some embodiments, the token module 240 is configured and/or programmed to generate a configurable payment token specific to the purchase order object, where the generated token is configured to be utilized by the employee to purchase the requested item or service, and provide the generated token to the employee of the organization. For example, the token module 240 may generate (or, cause to be issued) a virtual credit card, digital currency (e.g., Bitcoin), or other contractual object having an authorization amount similar to a cost to purchase the item or service.

In some cases, the credit card (or other identifier or code associated with an issued or provisioned credit of payment) may include metadata that identifies the purchase order and restricts use of the credit card only to the purchase of the item or service. For example, the metadata may include an authorization amount, an associated purchase order object, the employee submitting the request to purchase the item or service, a category assigned to the item or service, a vendor from which the item or service is to be purchased, a category assigned to the vendor, a vendor ID, point of sale (POS) ID, and so on. Metadata can also include information about one or more rules applied to a request or purchase order.

As described herein, the token or other credit object representative of payment for an ordered good or service may be issued or provided by a bank or other financial institution. However, in some cases, the entity providing aspects of the purchasing system 150 (e.g., a third party that provides the service or platform) may, itself, issue the tokens and extend credit to the organization when issuing the tokens. In other cases, the vendors themselves may issue the tokens, such as for organizations performing many purchases with a certain vendor or vendors.

In providing the tokens to the employees, the token module 240 sends the tokens to the parsing module 210, which inserts the tokens in various messaging systems. For example, the token module 240 may provide a virtual credit card to the employee via the collaboration tool that is accessed by the parsing module 240 (e.g., within a chat communication between the employee and a virtual bot representing the system 150).

In some embodiments, the order tracking module 250 is configured and/or programmed to receive an indication that the employee has purchased the item or service using the generated token, and generate an entry in a purchase order database of the organization for the purchase of the item or service. The generated entry (and other entries of the database) may include a description of the purchased item or service, information identifying a cost of the purchased item or service, information identifying the employee, information identifying the token used to purchase the item or service, and so on.

As described herein, the system 150 may store information relating to the token, specific credit card, virtual currency, or other credit object used to purchase an item along with purchase orders and other metadata associated with the purchase. When new orders are received, an organization may identify recurrences in purchase order requests, and authorize the orders based on determining the orders as recurrences. Further, the organization may build such databases to determine trends in costs or purchases, track expenditures at individual, team, class, group, or other organization hierarchy levels, and otherwise provide data for metric or analysis engines. The system 150 can also analyze rules that have been applied, or could be applied, to requests based on the stored information relating to tokens or other credits objects. For example, the system 150 can analyze requests to determine that certain kinds of requests are invariably approved or invariably denied, and accordingly suggest that a rule be configured to automatically approve or deny such requests in the future. The system 150 can also, for example, analyze requests to determine whether assigned approvers are properly approving or denying requests that are assigned to them via application of the rules.

For example, the organization may create a database that tracks costs for different categories of objects. Such a database, and its various information, may then be analyzed to identify future savings on purchases and used to provide other organizations with empirical data regarding costs and trends within different categories, among other benefits.

Figure 3:
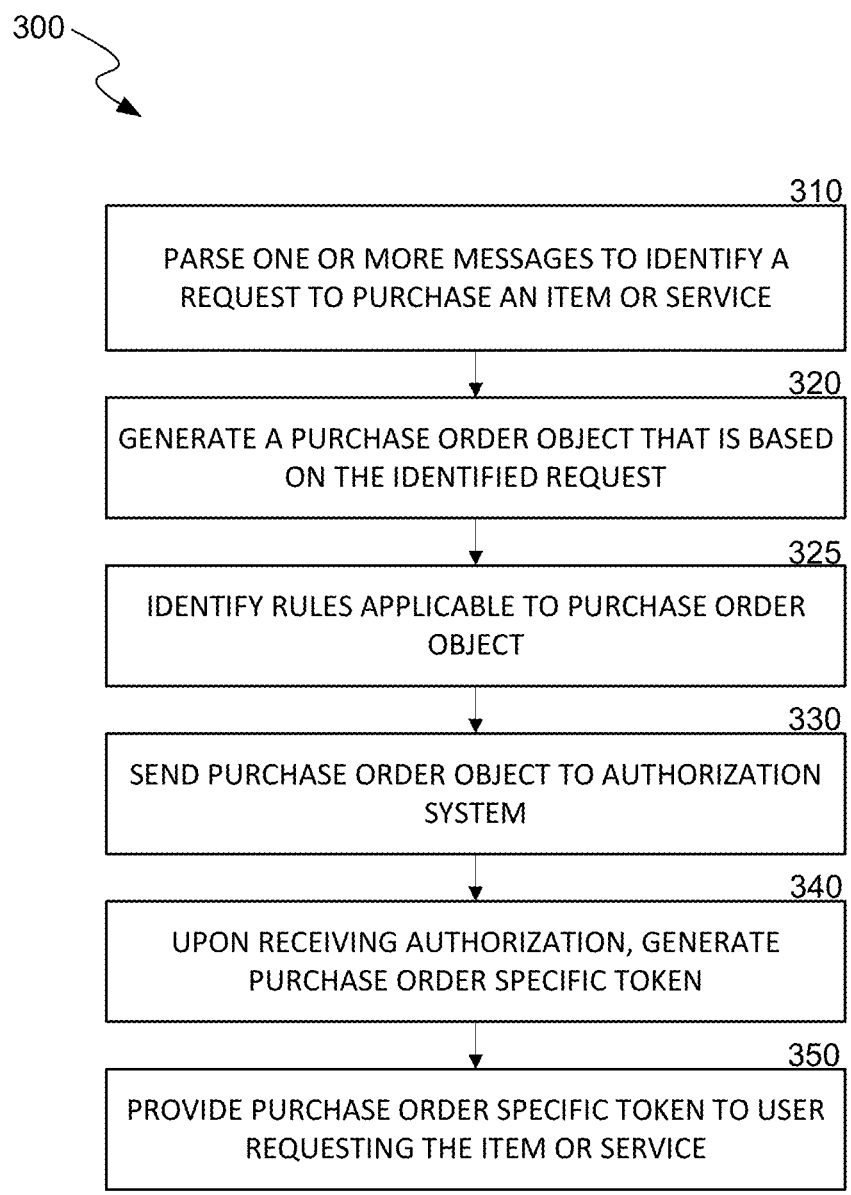
FIG. 3 is a flow diagram illustrating a method for generating tokens in response to determining purchase orders within messages.

Thus, as described herein, the purchasing system 150 may perform various methods, algorithms, routines or processes when managing purchase order operations for an organization. FIG. 3 is a flow diagram illustrating a method 300 for generating tokens in response to determining purchase orders within messages. The method 300 may be performed by the purchasing system 150 and, accordingly, is described herein merely by way of reference thereto. It will be appreciated that the method 300 may be performed on any suitable hardware.

In operation 310, the purchasing system 150 accesses one or more messages associated with an employee of an organization, where, in some cases, the one or more messages are sent between the employee and a virtual bot associated with a purchasing system. For example, the parsing module 210 may access one or more messages within a conversation supported by a collaboration tool of the organization (e.g., Slack), and/or one or more messages within a messaging system of the organization.

Further, the purchasing system 150 extracts, from the accessed one or more messages, purchase order information associated with a request from the employee to purchase an item or service. For example, the parsing module 210 parses messages or other plain text to identify a description of the item or service, a vendor providing the item or service, and an amount to purchase the item or service, from the messages.

In operation 320, the purchasing system 150 generates a purchase order object using the extracted purchase order information, where the purchase order object includes parameters for the request to purchase the item or service. For example, the purchase order module 220 may generate a purchase order object that includes a digital purchase order or other data structure, and includes parameters for the request to purchase the item or service, such as those extracted by the parsing module 210.

In operation 325, the purchasing system 150 identifies one or more rules applicable to the purchase order object. The one or more rules can be configured by a user using the rules engine 155, and can define one or more actions or approvers for the purchase order object.

In operation 330, based on the identified one or more rules, the purchasing system 150 receives authorization for the purchase order object. For example, the authorization module 230 may submit the purchase order object to the approval entity 125 for approval by an automated approval system or, in some cases, another employee of the organization (e.g., an employee within a finance department of the organization).

As another example, the authorization module 230 may determine the parameters of the purchase order object indicate a recurrence of the purchase order object being received by the purchasing system 150, and automatically authorize the purchase order object based on the purchase order object being a recurrence of a previously authorized purchase order object within the organization.

In operation 340, the purchasing system 150 generates a token specific to the purchase order object (e.g., a token for every order or every group of orders), where the generated token is configured to be utilized by the employee to purchase the requested item or service. For example, the token module 240 may generate (or, cause to be issued) a virtual credit card, digital currency (e.g., Bitcoin or Ethereum smart contract), or other electronic or digital token or object representing value having an authorization amount similar to a cost to purchase the item or service.

In operation 350, the purchasing system 150 provides the generated token to the employee of the organization. In providing the tokens to the employees, the token module 240 sends the tokens to the parsing module 210, which inserts the tokens in various messaging systems. For example, the token module 240 may provide a virtual credit card to the employee via the collaboration tool that is accessed by the parsing module 240 (e.g., within a chat communication between the employee and a virtual bot representing the system 150).

Figure 4:
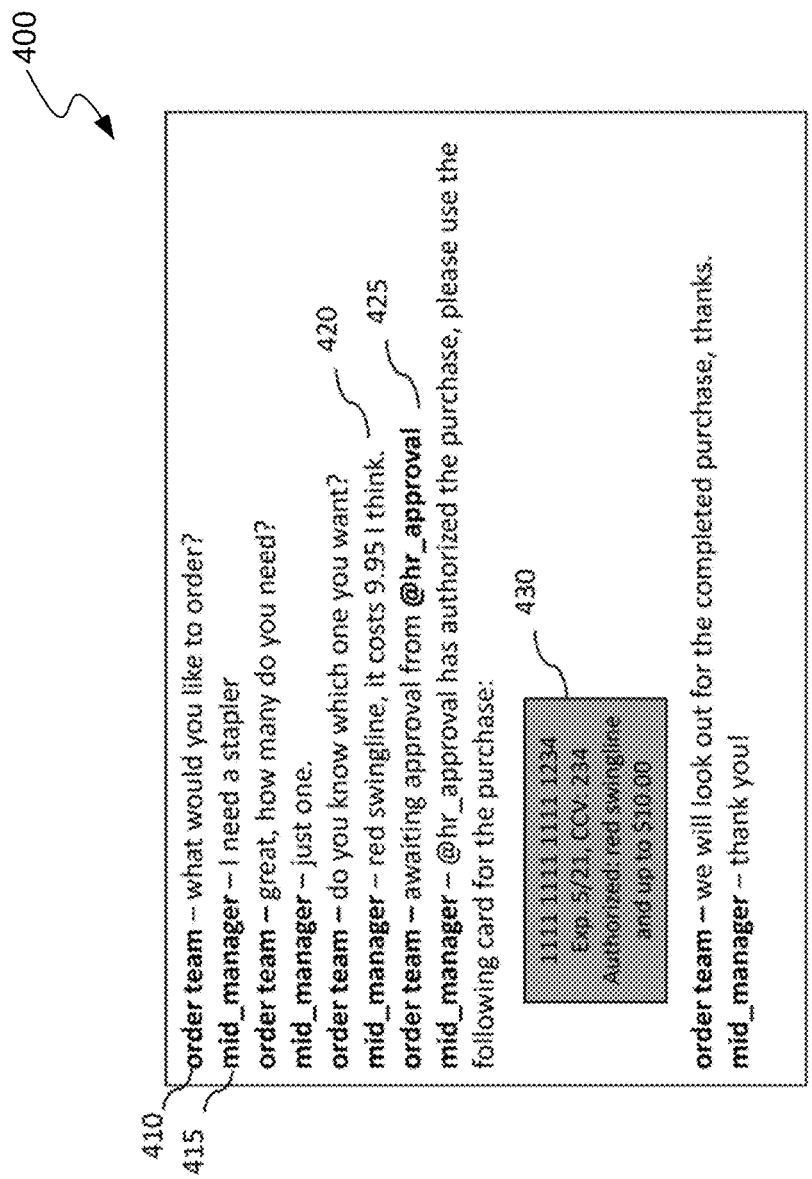
FIG. 4 is a display diagram illustrating an example user interface that presents a message-based conversation between an employee and a purchasing system.

Thus, in some embodiments, the purchasing system 150 performs operations for facilitating the ordering of items or services on behalf of employees via the tools they use during their daily business activities, such as collaboration tools, messaging systems, and so on. FIG. 4 is a display diagram illustrating an example user interface 400 that presents a message-based conversation between an employee and a purchasing system.

As an example, the interface 400 depicts a messaging system within a collaboration tool for an organization. An employee, having a username of "mid_manager," 410 messages the purchasing department, represented by a chatbot having the username of "order team" 415.

The chat bot walks the employee through various questions, and using the systems and methods described herein, identifies information from the messages received from the employee to be used in generating a purchase order. For example, message 420 indicates "red swingline, it costs 9.95 I think."

The system 150, via the chat bot, generates a purchase order for a Swingline stapler for $9.95, seeks authorization for the purchase according to one or more rules (message 425), and upon receiving authorization, generates and provides a token 430 (e.g., a virtual credit card) to the employee via the messaging system.

As described herein, in generating tokens for purchase orders that are unique and/or specific to underlying purchase orders associated with the tokens, and tracking purchases, rules, and other operations associated with the tokens, the systems and methods enable organizations to create new and enhanced databases of transactions.

These databases may store information relating to the token, specific credit card, virtual currency, or other object used to purchase an item along with purchase orders and other metadata associated with the purchase. An organization, therefore, may utilize such a database to identify recurrences in purchase order requests, determine trends in costs or purchases, track expenditures at individual, team, class, group, or other organization hierarchy levels, and so on. FIG. 5 is a diagram illustrating an example user interface that presents a view 500 of transactions performed via the purchasing system.

As depicted, the transaction entries may relate various information associated with a complete cycle of operations for a purchase, from initial request, to completed purchase details. Some of the information includes descriptions of the purchased items or services, information identifying costs of the purchased items or services, information identifying the employees, information identifying the tokens used to purchase the items or services (credit card numbers, virtual currency hashes), internal descriptions, transaction types (one time or recurring purchases), whether a transaction was automatically authorized (e.g., based on a rule), vendor information, receipts or payment confirmations, order histories, related items, and so on.

In some cases, the view 500 of transaction entries is sortable for any column of information, and may provide links or access to underlying information or documents. Further, selection of one or more entries (such as a username or vendor), causes navigation to additional interfaces that present entry specific information. For example, the system 150 can present vendor-specific transaction information, user-specific transaction information, category-specific transaction information, and so on. In addition, the system 150 can present information about rules applied to specific transactions, and allow a user to navigate to the rules engine to review, edit, and test rules, and so forth.

Thus, as described herein, the systems and methods access messages associated with an employee of the organization, parse the accessed messages to identify parameters for a purchase order associated with purchasing an item for the employee, and generate a token that is specific to the identified parameters for the purchase order, which may then be used by the employee when purchasing the item (or, service).

Examples of Work Flows for Managing Purchase Orders for an Organization

As described herein, the purchasing system 150 may perform various operations and work flows in order to manage end-to-end purchase operations for an organization. The following are example processes performed by, or supported by, the purchasing system 150.

In some embodiments, the purchasing system 150 extracts relevant metadata from a user's plain text request, and converts the metadata to a purchase order. The system 150 determines a message type, where a user's incoming request in the form of a plain text message or plain voice message is delivered via a messaging application, and is used to determine its "message type" based on a series of algorithms applied to the text. The message type may determine or indicate which pieces of information may be extracted from the message itself.

The system 150 determines message intent, where the message type is combined with the user's current context and an "intent" is determined for that message, which drives certain specific programmatic actions, for example, actions to extract parameters from the message, such as purchase amounts, items, vendors, and others described herein.

The system 150 sets and associates a message context based on the success or failure of the actions driven by the intent. For example, a context may be set and associated with a specific employee. The system 150 may continue processing until a purchase order object is generated.

Once the purchase order object is generated, the system 150 associates the object to an approver or approving function (e.g., entity 125) associated with the user or employee, and routes the object to the approver for approval or rejection, based on one or more rules applicable to the object. The system 150 generates a formatted message, and displays it to the approver via a messaging application, as well as displaying the object on a system web application. The message presents options to Approve, Deny, or Skip the request, which can be done by responding to the purchase order message via the messaging application or web application display.

The approval process may be performed as follows:

The system 150 generates a purchase request decision message, with details such as: approver identity (e.g., who approved the purchase order); approval amount (the amount the PR is approved for); date and time of approval; and any other information relevant to the purchase order or organization.

The system 150 applies various rules and algorithms to the purchase order to determine the desired payment processor, current funding levels, required funding levels, funding sources, and so on. If funding levels are adequate, the purchase order and decision are used to dynamically generate API requests to a third party payment vendor (e.g., entity 130), which results in a payment token (e.g., the payment token referencing a payment method), to be used at a vendor accepting the designated payment method.

If funding levels are inadequate or not available, the system 150 sends the purchase order into a requires-funding state, and is fulfilled once funding becomes available.

The system 150 may then display or otherwise provide the payment token 140 and/or payment method to an employee requesting a purchase via the messaging services described herein (such as the messaging service used by the employee to submit the initial request), such as depicted in FIG. 4.

Once the employee receives a payment token, the employee may use the payment token at the approved vendor. The system 150 receives notification from the third-party payment processor of the state, amount, vendor, and other various metadata of the financial transaction of the issued payment token. This transaction data is then used to create a "Transaction Object" and associate it with the appropriate purchase order, and may be stored in various databases, such as the database depicted in FIG. 5.

Thus, the following scenario is supported and/or enabled by the purchasing system 150: A user accesses a messaging system and initiates a request to purchase a good or service via a plain text message. The user message is parsed to determine relevant data and metadata.

When parsing, the system 150 may determine the message type, the intent of the message, extract parameters from the message, and set user context for the purchase request message. After the plain text message has been parsed, the system 150 generates a purchase order object, which is an analog or represents a purchase order. The purchase order object may include metadata relating to the purchase request to identify the requester, item, quantity or amount, price, vendor, date, and other information, in order for a decision to be made regarding the request.

The system 150 routes the purchase order object to an approver or approvers associated with the requesting user. Routing the purchase order object can be based on one or more rules configured using a rules engine. The approver, or authorization entity, may view an approval menu via an interface on an approver's device, including various action options, such as an Approve Action, a Deny Action, and a Skip Action. In some implementations, actions can be automatic based on one or more rules applied to the request.

Should the approver choose to take no action or to skip the approval of the order, the system 150 remains in the approval routing process, and the approver may take action on the order at a later time. If the order is rejected, a plain text message is generated and the denial of the purchase request is communicated to the user.

If the order is approved the system 150 initiates a payment method process, including determining the payment processor, determining required funding, determining current funding, and generating payment rules. With the payment method 530 determined, the system 150 performs a verification of funds 535. If funds are verified, the system 150 generates and routes a payment request through a third party API, to generate a payment token for the purchase specified in the plain message text.

The payment token and a notification of approval are put into a formatted payment message and delivered to the requesting user. Upon receipt of the payment message, the user may use the payment token at the prescribed vender to make a purchase. The payment token may take the form of any payment system token.

In some embodiments, once the purchase is complete, the system 150 initiates reconciliation process 570, where the purchase transaction is created and linked to the original purchase request, and stored in a transaction database. In some cases, a plain text message is generated and sent to the approver, so that the approver knows the purchase has been made and that the token has been used.

Examples of the Rules Engine

As described herein, in some embodiments, the system enables users to easily map their current business processes and workflows to the system, where they can define a sequence of actions that should occur for specific requests to be approved (or rejected). For example, the system enables users to define, via rules engine 155, a set of conditions and actions, of which the conditions evaluate to true for the actions to apply. The system effectively encodes messages into workflow rules.

The system includes various implementations, including:

A user interface that allows users to create, test, edit, enable, disable, re-order, filter, export, and delete "rules"; and/or A backend system which uses "rules" to determine the approver(s) for a Purchase Request.

The following details illustrate various aspects of the rules engine 155. A "rule" contains one or more "conditions", as well as one or more "actions" to be applied if the "conditions" evaluate to true, based on Boolean logic. "Conditions", in some cases, are at least three-value objects. The first part is any property of a "Purchase Request". This can include amount, recurrence, requestor, accounting dimensions (category, class, department, location, etc.), vendor, payment method type (Purchase Order, Virtual Card, Reimbursement), and so on. The second is a Boolean operator. The last is a set of values which apply to the selected property. For example, a set of "conditions" could be: "amount" "greater than" "$50"; "category" "is" "Travel".

In some cases, conditions can include not only information that is explicitly part of the purchase request, but also properties of the person requesting (requestor, department, title/level, and so on), or other outside context (e.g., past request history, a budget, and so on) that exists within the system, or external to the system, and can also be used as a condition. Thus, a condition can be purchase request information or other information stored or received by the system and associated with the request, such as information for a person or entity associated with request, and/or outside context information for the request. Contextual information can include, for example, any information not explicit in the request that is associated with a requestor, a vendor, a credit object or type of credit object, an approver, and so forth. Contextual information can also include information from external sources, such as databases external to the system that include information about requestors, requested vendors, and so forth. For example, the system can access a database to identify information that a requested vendor is fraudulent or otherwise not an approved vendor, and apply this contextual information (e.g., by applying an automatic rejection rule). Contextual information can further include, for example, history of previous requests that are similar or identical to the received request, analysis of domain names or packet header data in the request, information related to the request received from a firewall or other network security function, or data received from an external data source regarding current network threats.

"Actions" are at least one-value objects. The primary value is the "action" which will take place once the condition is met. This includes "auto-approve", "auto-reject", "assign approver", "alert", "stop processing", and so on. For example, a set of "actions" could be: "alert" "Justin" with message "This is not a valid request"; "auto-reject".

An example set of actions includes:

"auto-approve": automatically approve the "Purchase Request";

"auto-reject": automatically reject the "Purchase Request";

"assign": create an approval step for the "Purchase Request" assigned to a specific "approver";

"alert"-type: send user-generated messages;

"stop": terminate the evaluation of any further rules;

"integration"-type: steps in third-party systems which should occur.

For example, for customers utilizing the Ironclad Software-as-a-Service tool for contract management, the system can defer the "Purchase Request" approval until the contract management portion is completed in Ironclad. In these and other implementations, actions can include routing a request to a different system, such as a third-party system accessed via an application or website, for review and approval or disapproval, or for other actions. After completing any required actions via the different system, the request can be routed back to the purchasing system. In an example implementation, a rule applied to a request can redirect a user to a third-party vendor website (e.g., based on the vendor requested or assigned to a request), where the user then selects one or more items to include in the request. After selecting the items, the user is then redirected to the purchasing system to continue the process.

In some cases, rules are applied to "Purchase Requests" in a strictly ordered, additive fashion. For example, for each "Purchase Request", every active "rule" is evaluated against that "Purchase Request" in an ordered fashion, and every "rule" whose "conditions" evaluates to true has its "actions" applied. The only exceptions to this are for specific "actions" which short-circuit: "auto-approve", "auto-reject", and "stop".

When a rule's "action" is set to "auto-approve" or "auto-reject", that rule is hoisted to the top of the chain and evaluated first. If it evaluates to true, the rest of the chain is removed.

When a rule's "action" is set to "stop", and it evaluates to true, any rule that is ordered after that rule is removed from the chain (this allows for certain rules to "terminate" early).

The result from the evaluation of a set of "rules" against a "Purchase Request" is a set of audit-able "Purchase Request Decision Steps", or approvals, which are made in order to determine if the "Purchase Request" is approved or rejected. The approvals and information about rules applied to a "Purchase Request" can be stored in a database of transactions, for example, to allow for evaluation of rules and associated actions, approvals, disapprovals, and so forth.

The system requests the needed approvals from the assigned "approver" based on the evaluated rules and their ordering. If the current approver elects to "reject" the request, the chain terminates with the rejection of the "Purchase Request". Otherwise, the system will request the next approval once the previous step has been approved. If all steps are "approved", the system generates the requested payment method based on the "Purchase Request".

The following example user interfaces (depicted in FIGS. 6-14) illustrate various aspects of the rules engine 155, including its implementation and user experiences with the system.

Figure 6:
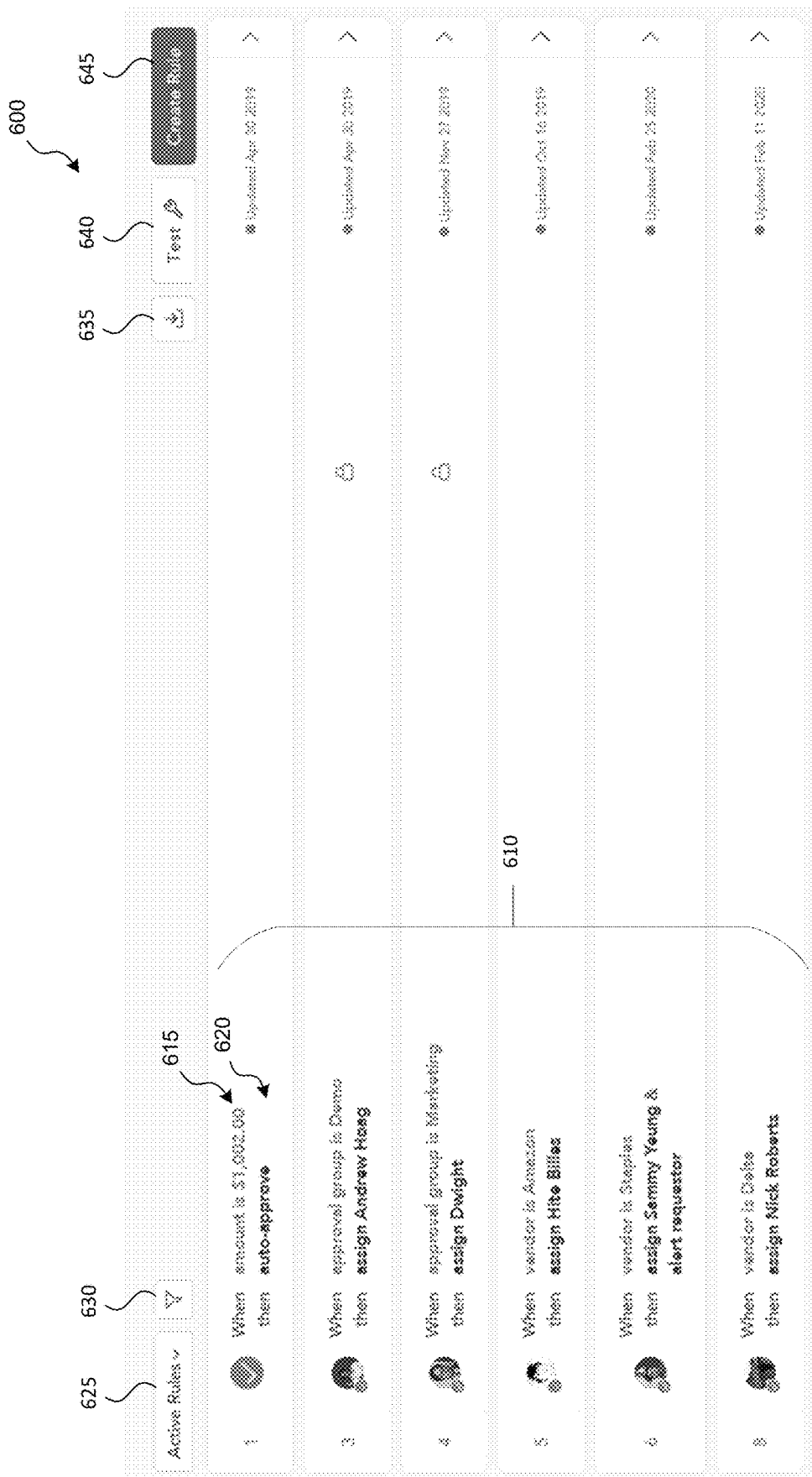

The graphical user interface (GUI) 600 depicted in FIG. 6 includes the organization's list of "rules" 610, as well as filters to search for specific rules, an "export" functionality, a "test rule" functionality, and a "create rule" functionality. The user can also re-order the "rules" by dragging and dropping any "rule" above or below any other "rule," which can change the order in which the "rules" are applied. Each rule in the list of rules 610 is configured with one or more conditions 615 that, when present, is associated with one or more actions 620. As described elsewhere herein, rules can include an action or a set of actions, such as auto-approve, auto-reject, assign approver, alert, stop, redirect to a different system, and so forth. The GUI 600 includes a drop-down menu 625 that, when selected by a user (not shown), displays one or more lists that can be selected for display in the GUI 600, such as an Active Rules list, an Inactive Rules list, a list of test rules, a list of rules applicable to certain categories of purchase requests, and so forth. The GUI 600 also includes a filter icon 630 that, when selected (not shown), allows a user to select one or more rule criteria for filtering display of rules in the list of rules 610. For example, the display can be filtered to only show rules created by a certain user, rules that automatically reject a request, rules that automatically approve a request, rules applicable to certain kinds of requests, and so forth. The GUI 600 also includes an export icon 635 that, when selected (not shown), causes the system to generate a comma-separated values (CSV) file containing the rules displayed in the list of rules 610. The GUI 600 also includes a test icon 640 that, when selected, allows a user to access a "test rule" functionality described below with reference to FIG. 8. In addition, the GUI 600 includes a create rule icon 645 that, when selected, allows a user to access a "create rule" functionality described below with reference to FIGS. 9 through 13.

Figure 7:
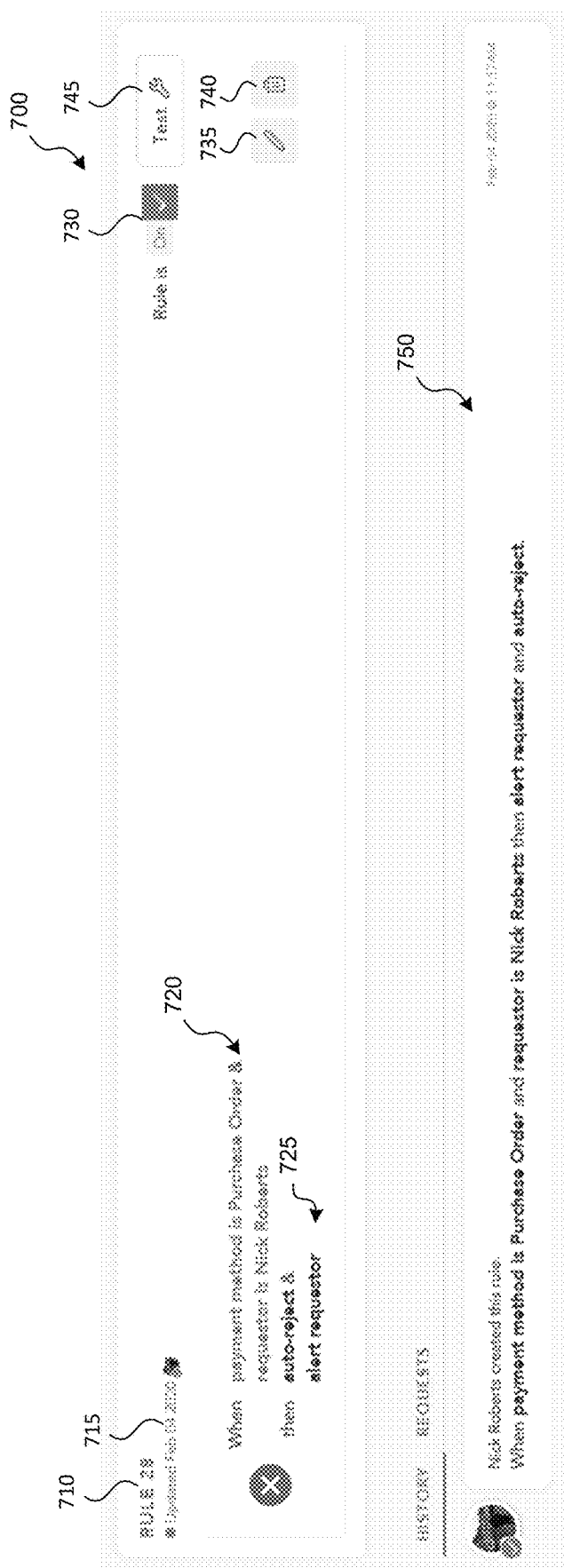

FIG. 7 depicts a graphical user interface (GUI) 700 presenting details about a rule, which is displayed in response to a user click on any existing "rule" in the list of rules 610, to view details about that "rule", as well as edit it. The GUI 700 includes a title 710 for the displayed rule and a date 715 when the rule was last edited. The displayed rule is associated with one or more conditions 720 and one or more actions 725. An indicator icon 730 displays whether the rule is "on," indicating that the rule is being applied to requests received by the system. The indicator icon 730 can be selected to turn a rule off or on. An edit icon 735 can be selected to allow a user to edit the rule, such as by allowing the user to add or remove conditions or actions, revise the title of the rule, and so forth. A delete icon 740 allows the user to delete the displayed rule, which removes the rule from the list of rules 610 and ceases application of the rule to purchase requests. A test icon 745 allows the user to access the "test rule" functionality described below with reference to FIG. 8. In a separate region 750 of the GUI 700, history information is displayed about the rule. For example, history information can include previous versions of a rule, a user who created the rule, information about when a rule was created or edited, information about when the rule was on or off, and so forth. When the rule is created or edited, the region 750 is automatically updated to reflect creation of the rule or changes of the rule.

Figure 8:
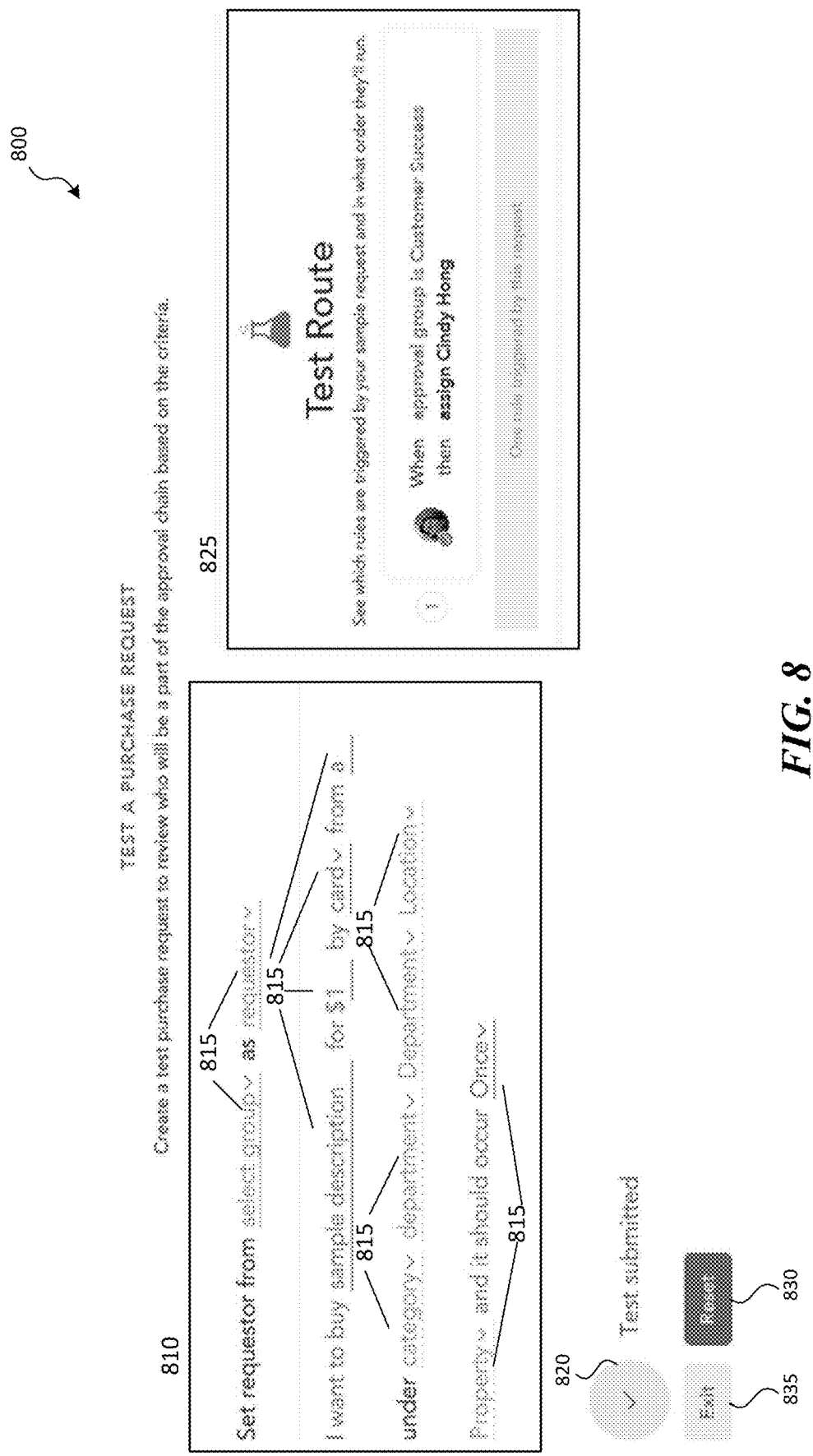

FIG. 8 depicts a graphical user interface (GUI) 800 providing a "test rule" functionality, where the system allows a user to create a test "Purchase Request" and run it through the "rules" engine to see what the resulting "actions" would be. In a first region 810 of the GUI 800, various fillable or selectable fields 815 allow a user to submit test purchase request information. Each fillable or selectable field 815 can be, for example, fillable to allow a user to type an input (e.g., an amount for a purchase, a description of an item service or expenditure, a vendor name, and so forth) or selectable, such as by displaying a drop-down menu (not shown) allowing a user to select from a set of options for each piece of purchase order information. For example, selectable fields might display predetermined types of tokens or credit objects (e.g., virtual card, purchase order, digital currency, prepaid card, etc.). Other fillable or selectable fields 815 can specify a requestor or group associated with a requestor, a category of item, service, or expenditure, a department associated with a requestor or approver, a location associated with a request, whether a request is one-time or recurring, and so forth. Based on the inputs specified in the first region 810 of the GUI 800, the system generates a test purchase request. An indicator 820 indicates that the test purchase request has been submitted. In a second region 825 of the GUI 800, information is displayed about a "test route" triggered by the test purchase request. The "test route" information indicates which rules are triggered by the test purchase request, and the conditions and actions associated with each applied rule. A reset button 830 resets the fillable or selectable fields 815 in the first region 810 of the GUI 800, thereby allowing a user to define another test purchase request. An exit button 835 allows a user to exit from the test rule functionality. Thus, once a user has defined one or more rules, the user can use the GUI 800 to submit test requests to confirm whether the one or more rules are functioning as intended.

In some cases, the system provides a "create rule" functionality, which allows a user to create and test a new "rule" in a multi-step process.

Figure 9:
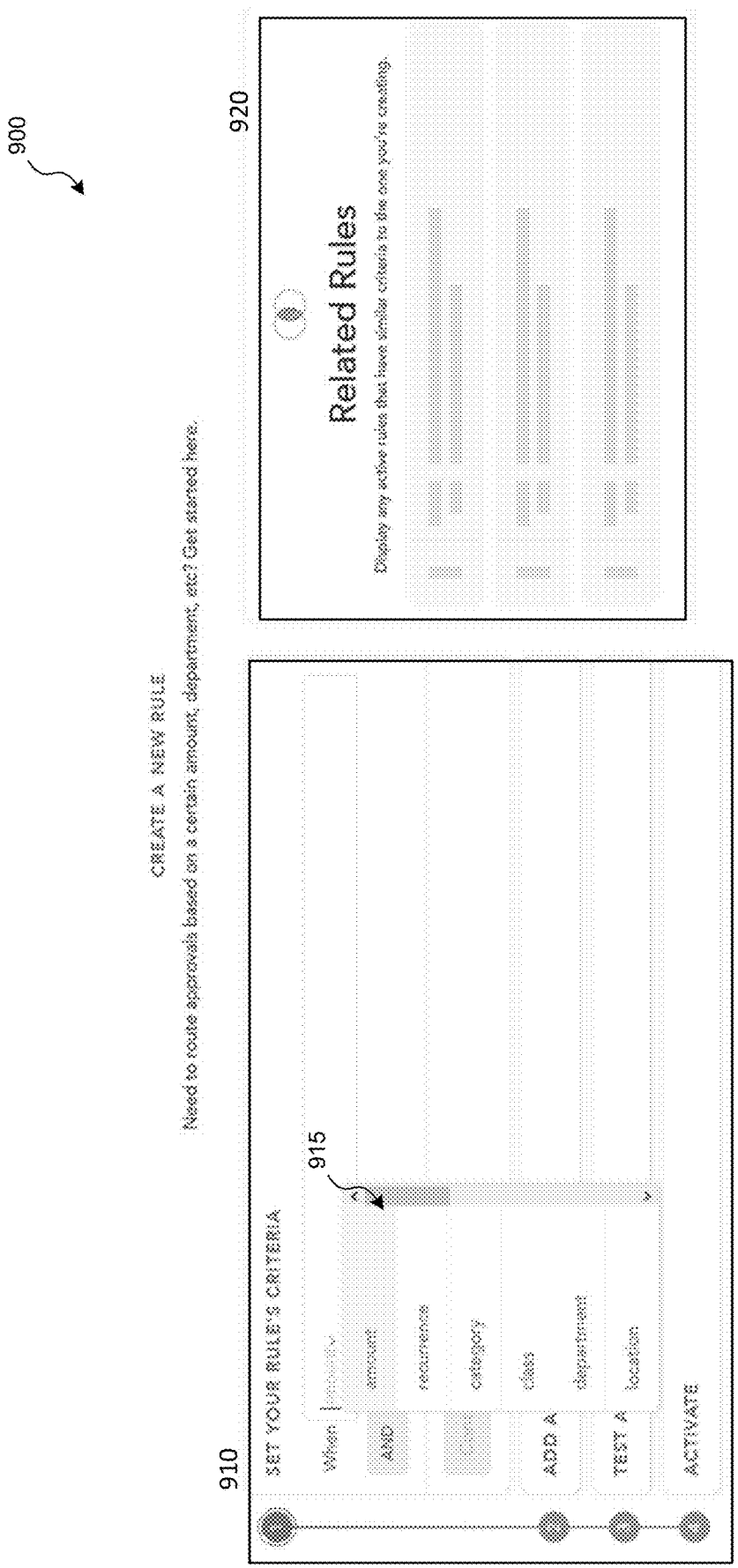

First, as depicted in graphical user interface (GUI) 900 of FIG. 9, the user configures one or more "conditions" which must evaluate to true for the "rule" to apply to a new "Purchase Request". In a first region 910 of the GUI 900, the user can select a dropdown menu 915, which displays various categories of conditions that can be defined for a rule, including an amount of a request, whether a request is recurring, a category (e.g., of a requested item, service, or expenditure), a class, a requestor department, or a location associated with a request. Other conditions from which a user can select include characteristics of a user or approver, or any request parameters, such as a vendor, a means of payment, an assigned approver, and so forth. Conditions also include Boolean operators and associated information, such as "equals," "greater than," "less than," "greater than or equal to," "less than or equal to," and so forth. Conditions can also be defined using fillable fields, such as for defining amounts of money, descriptions of items, services, or expenditures, and so forth. A user can define one or multiple conditions of a rule. In a second region 920 of the GUI 900, a list of related rules is automatically displayed, based on the inputs at the first region 910. However, in the depicted example of FIG. 9, no related rules are displayed because no inputs have been received.

Figure 10:
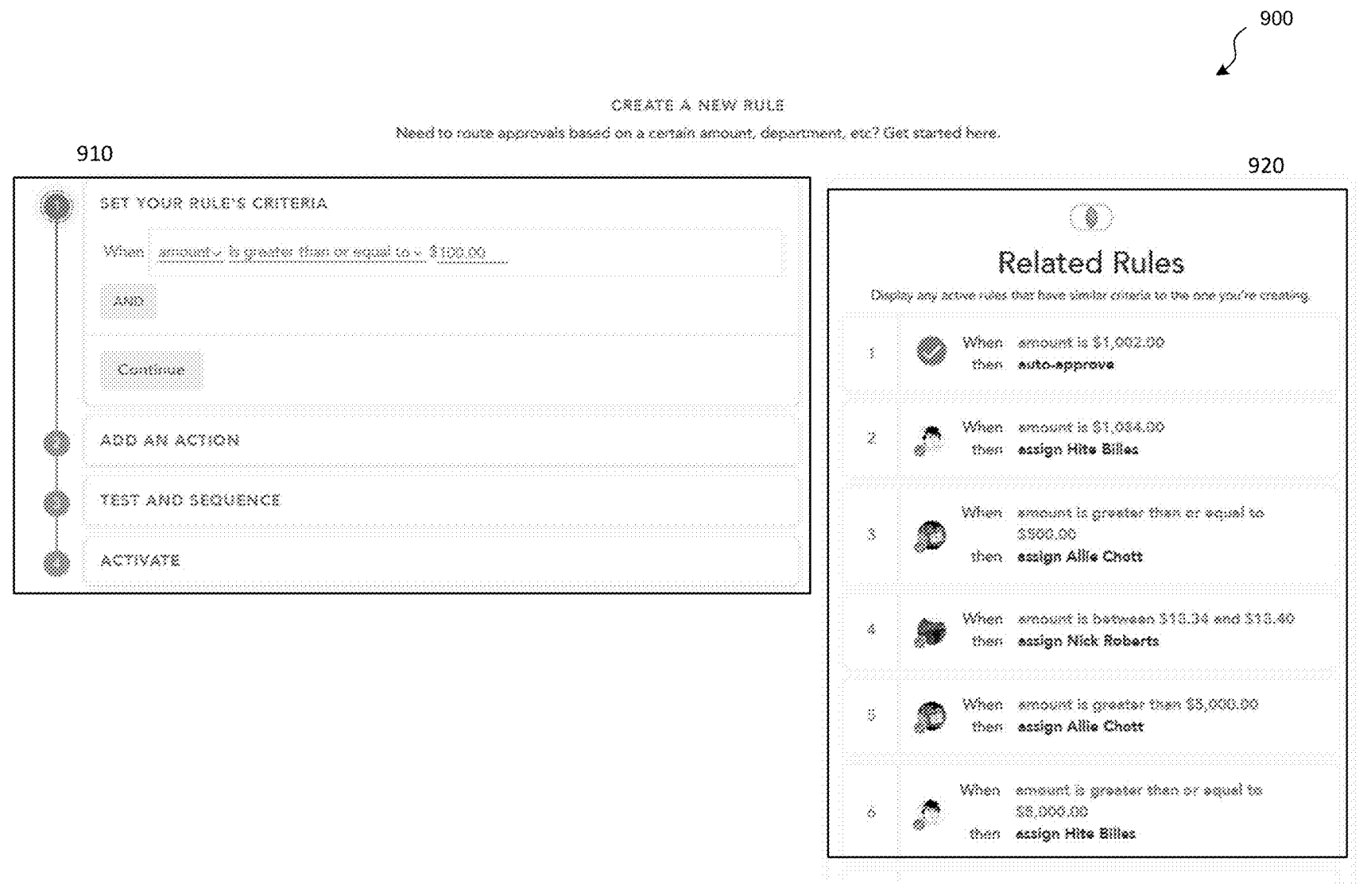

As shown in FIG. 10, the second region 920 of the GUI 900 automatically displays "Related Rules" when "conditions" are defined in the first region 910. These are "rules" that share similar "conditions" to "rules" which have already been created. This allows a user to avoid creating duplicate "rules", as well as to reference old "rules".

Figure 11:
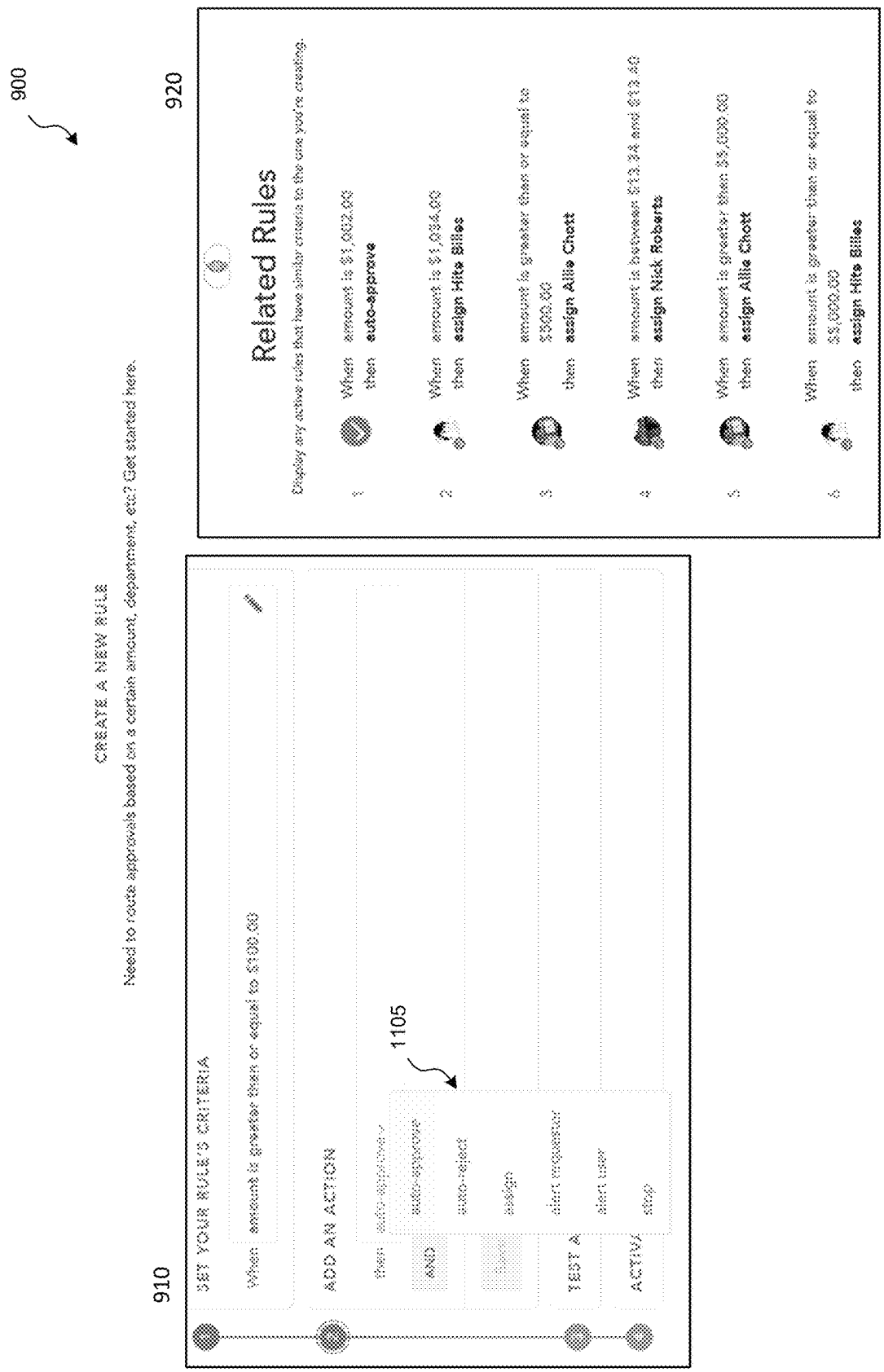

As shown in FIG. 11, a user can configure one or more "actions" which will occur if the defined "condition(s)" evaluate to true. A user selects a drop-down menu 1105, which causes display of selectable actions that can be performed when a rule is applied. The actions include auto-approve, auto-reject, assign (i.e., assign a specified approved for a request), alert requestor, alert user (e.g., an approver, an adminstrator, etc.), and stop (i.e., when the defined condition(s) are met, the process stops and no further action is taken with respect to a received request). Some selectable actions require additional inputs (not shown), such as an "assign" action, which requires a user to provide an input of an approver to assign to a request. As described above, some actions trigger one or more external systems and/or processes, such as by redirecting to an application or a website, in which case these actions, when added to a rule, may require a user to specify the application or website. As actions are defined in the first region 910, the second region 920 dynamically adjusts to display related rules based on the received inputs.

Figure 12:
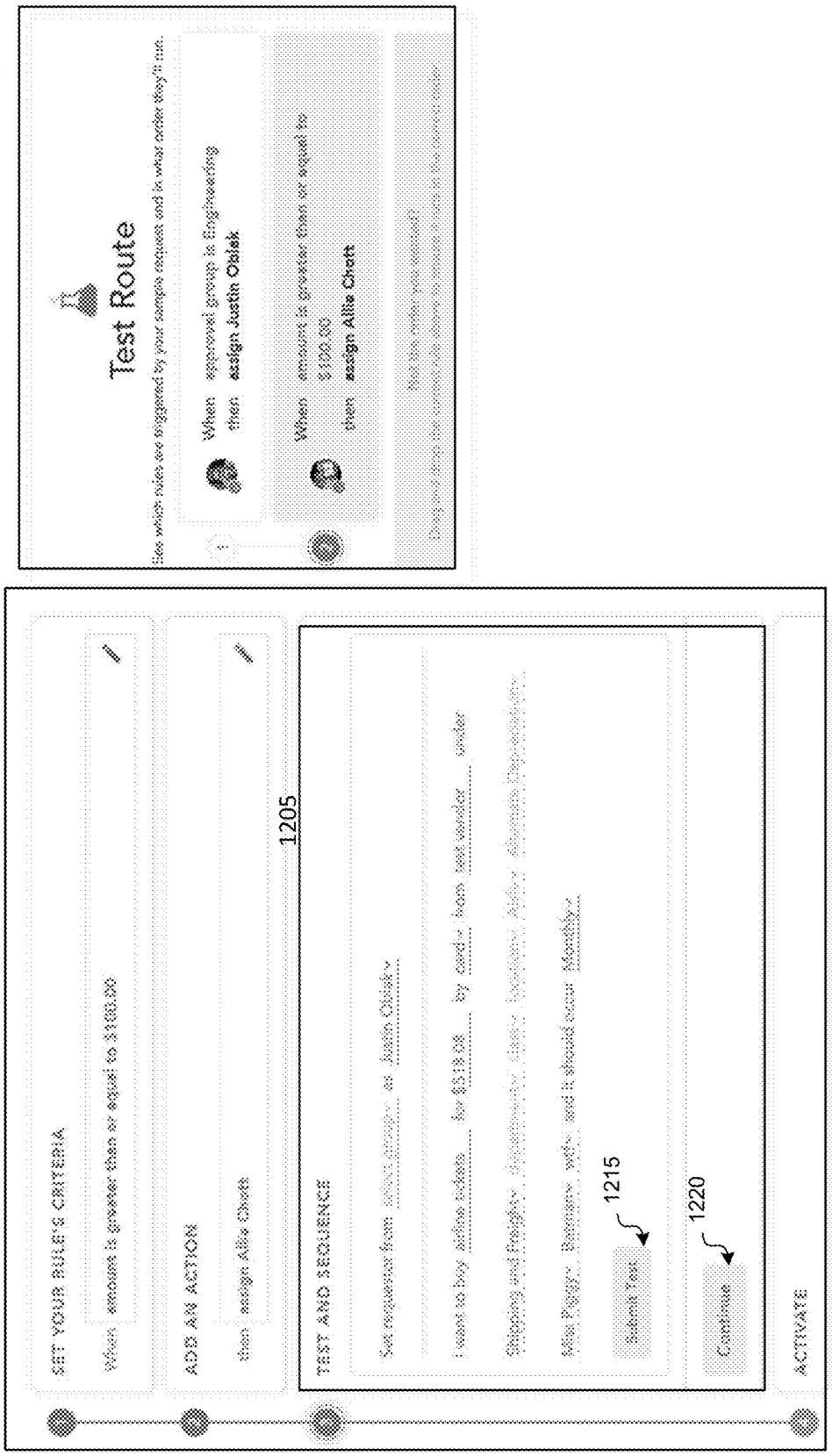

As shown in FIG. 12, a user can also test the "rule" via GUI 900, to ensure that the "conditions" evaluate in the way the user expects them to. Once conditions and actions for a rule have been defined at the first region 910 of the GUI, a "test and sequence" region 1205 is displayed with various fillable or selectable fields that allow a user to submit test purchase request information. These fillable or selectable fields function as described in FIG. 8 with respect to fillable or selectable fields 815. Once the user has defined the test purchase request information in the "test and sequence" region 1205, the user selects a "submit test" button 1215, which causes the system to execute a test purchase request. In a region 1210, information is displayed about a "test route" triggered by the test purchase request. The "test route" information indicates which rules are triggered by the test purchase request, and the conditions and actions associated with each applied rule. In the region 1210, the user can also change the "ordering" in which the "rules" are applied by dragging-and-dropping the "rule" on the "Test Route" panel. For example, if the user wanted "Allie Chott" to approve before "Justin Oblak" in the exhibit below, they could drag "rule" number 2 above "rule" number 1 on the "Test Route" panel. The user can select "continue" button 1220 to advance past the "test and sequence"

Figure 13:
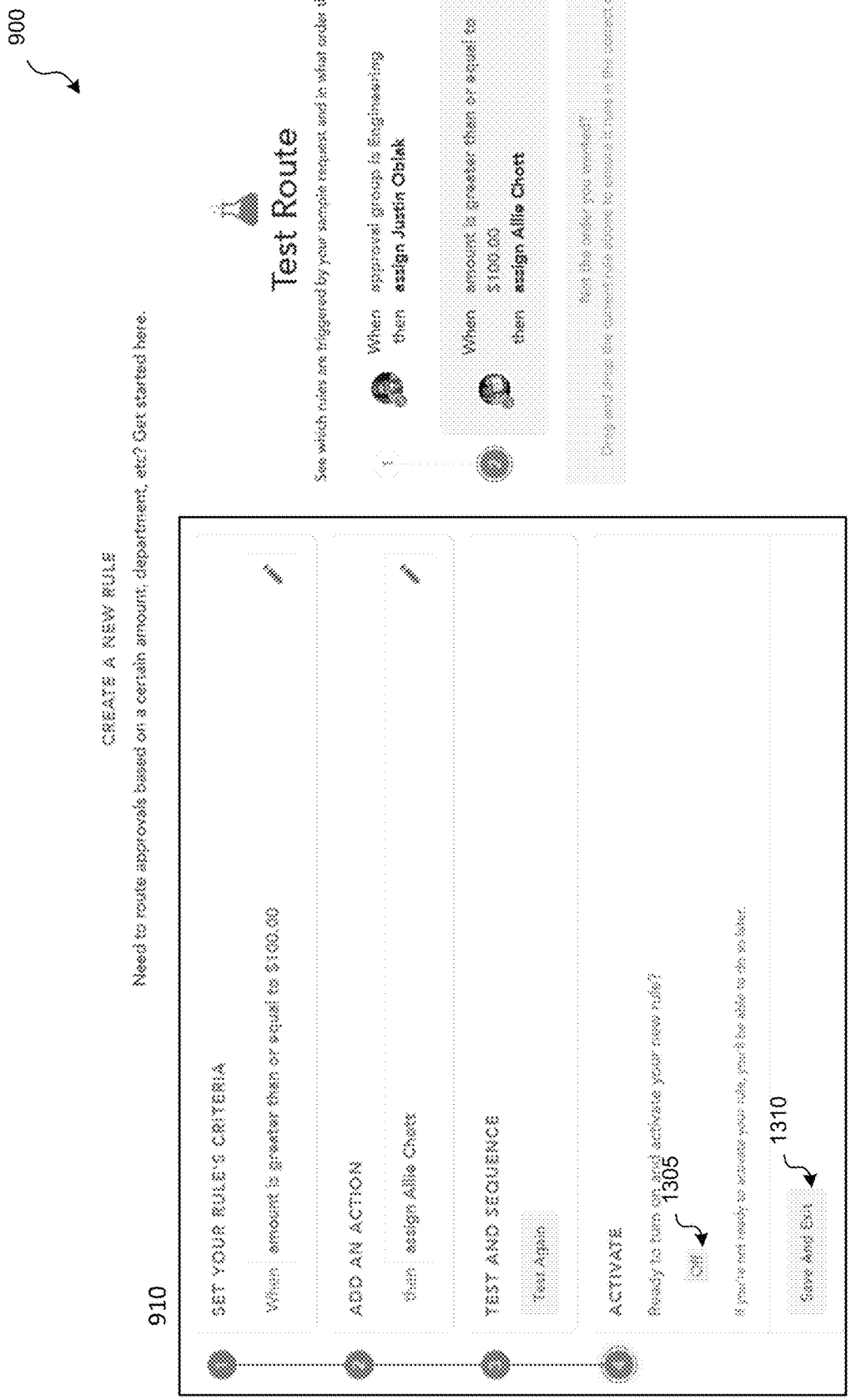

As shown in FIG. 13, the GUI 900 next enables a user to activate and save the "rule". To activate the rule, the user can select on/off button 1305 to specify that the rule should be "on" (i.e., that the rule will be applied to received requests). To save the rule and exit the GUI 900, the user can select "save and exit" button 1310. A "rule" will only be applied if it has been activated by a user.

Figure 14:
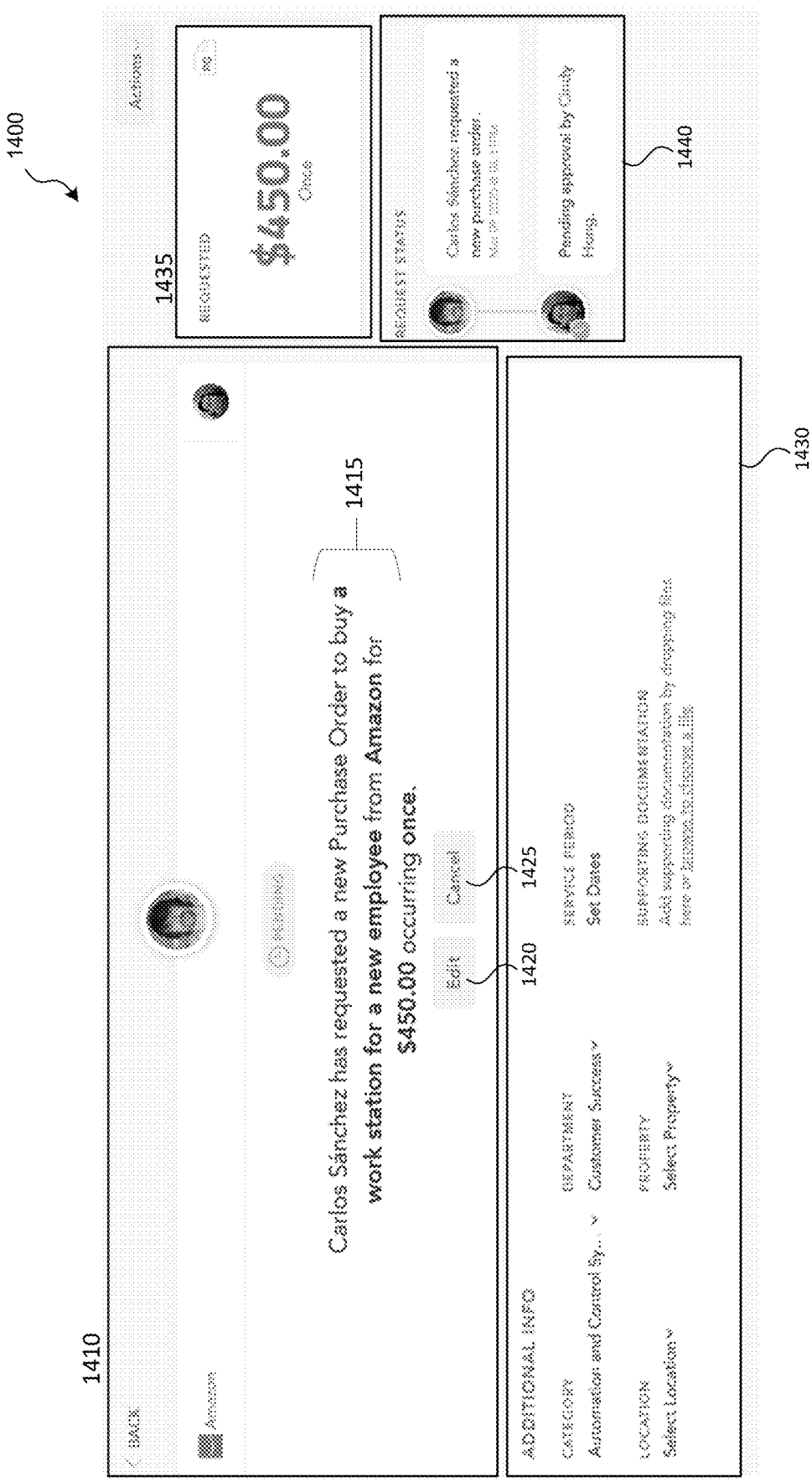

FIG. 14 depicts an example graphical user interface (GUI) 1400 for showing a pending request and an active rule that is applied to the purchase request. This GUI 1400 can be accessed, for example, by an administrator of the system. As depicted, once a "rule" has been created and activated, it will be applied against new "Purchase Requests". In this example, "Carlos" made a new "Purchase Request", and one "rule" was applied to the request. In a first region 1410 of the GUI 1400, information is displayed about the pending request, including an identity of the requestor ("Carlos Sanchez"), the means of payment requested ("purchase order"), a description of the expenditure ("work station for a new employee"), a vendor ("Amazon"), an amount request ("$450.00"), and recurrence information ("once"). An edit button 1420 enables a user to edit the request, such as by changing the amount, vendor, means of payment, recurrence information, and so forth. A cancel button 1425 allows a user to cancel the request, which ceases any action on the request. A second region 1430 of the GUI 1400 displays additional information about the purchase request, including a category of expenditure, a department associated with the request, a location associated with the request, a property of the request, a service period, and means for uploading supporting documentation for the request. A third region 1435 of the GUI 1400 shows summary information about the purchase request, including the requested amount and the recurrence information. A fourth region 1440 of the GUI 1400 shows information about a request status, which can be based on one or more rules applied to the purchase request. In the depicted example, the applied "rule"'s action was to "assign" user "Cindy Hong" as an approver for the request, and thus the user can see in the region 1440 that this request is pending "Cindy Hong"'s approval.

Of course, the rules engine can include other interfaces or presentations not explicitly shown herein.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A computer-implemented method of managing purchases associated with an organization, the method comprising:
   receive a set of rules to apply to a purchase order object;
   change an order in which the set of rules are applied based on a dragging and dropping operation to re-order at least one rule in the set of rules;

receiving, at a purchasing system of the organization, a purchase request message from a user associated with the organization;

extracting, by the purchasing system, purchase order information from the purchase request message,
wherein the purchase order information is associated with a request from the user to make a purchase;

generating, by the purchasing system, the purchase order object using the extracted purchase order information;

identifying, based at least in part on the purchase order information, the set of rules applicable to the purchase order object,
wherein each rule in the set of rules is associated with at least one condition that, when present, causes the rule to be applied, and
wherein each rule in the set of rules is associated with at least one action applied to the purchase order object when the rule is applied;

applying, to the purchase order object and for each rule in the identified set of rules, the at least one action,
wherein the at least one action includes sending the purchase order object to an approval entity;

upon receiving authorization from each approval entity, generating, by the purchasing system, a digital credit object configured to allow the user to make the purchase,
wherein the digital credit object is configured with metadata about the set of rules applicable to the purchase order object; and providing, by the purchasing system, the digital credit object to the user, for the user to make the purchase.

2. The computer-implemented method of claim 1, wherein the at least one action includes a set of actions comprising two or more of auto-approve, auto-reject, alert requestor, assign approver, trigger external process, or stop processing actions.

3. The computer-implemented method of claim 1:
wherein the at least one condition includes at least one of an amount of the requested purchase, a description of the requested purchase, a category of item or service requested, an identity of the user, a recurrence or non-recurrence of the request, a requested method of payment, or an account from which funds are requested, and
wherein the approval entity is an automated system or an employee of the organization.

4. The computer-implemented method of claim 1:
wherein the purchasing system includes a virtual bot that receives the purchase request message,
wherein access to the virtual bot is provided to the user via a collaboration tool, and
wherein the collaboration tool includes a messaging interface via which the purchase request message is received by the virtual bot and via which the digital credit object is provided to the user.

5. The computer-implemented method of claim 1, further comprising:
generating an entry in a purchase order database that includes information about at least two of the provided digital credit object, the identified set of rules, the purchase, the user associated with the organization, the approval entity, or an amount of the purchase.

6. The computer-implemented method of claim 1, wherein the provided digital credit object is a virtual credit card, a virtual prepaid card, an amount of digital currency or cryptocurrency, or a purchase order.

7. The computer-implemented method of claim 1, wherein identifying the set of rules applicable to the purchase order object is further based, at least in part, on contextual information associated with the purchase request message,
wherein the contextual information includes at least two of: a date associated with the purchase request message, an identity of the user associated with the organization, an identity of an approver of the purchase order object, a location associated with the user or the approver, a group or department of the user or the approver, a category for the purchase, a domain name or packet header associated with the purchase request message, or a vendor associated with the request.

8. At least one computer-readable medium, excluding transitory signals, carrying instructions that, when executed by a computing system, cause the computing system to perform operations comprising:
receive a set of rules to apply to a purchase order object;
change an order in which the set of rules are applied based on a dragging and dropping operation to re-order at least one rule in the set of rules;
receive, at a purchasing system of an organization, a purchase request message from a user associated with the organization;
extract, by the purchasing system, purchase order information from the purchase request message,
wherein the purchase order information is associated with a request from the user to make a purchase;
generate, by the purchasing system, the purchase order object using the extracted purchase order information;
identify, based at least in part on the purchase order information, the set of rules applicable to the purchase order object,
wherein each rule in the set of rules is associated with at least one condition that, when present, causes the rule to be applied, and
wherein each rule in the set of rules is associated with at least one action applied to the purchase order object when the rule is applied;
apply, to the purchase order object and for each rule in the identified set of rules, the at least one action,
wherein the at least one action includes sending the purchase order object to an approval entity;
upon receiving authorization from each approval entity, generate, by the purchasing system, a digital credit object configured to allow the user to make the purchase,
wherein the digital credit object is configured with metadata about the set of rules applicable to the purchase order object; and
provide, by the purchasing system, the digital credit object to the user, for the user to make the purchase.

9. The at least one computer-readable medium of claim 8, wherein the at least one action includes at least one of auto-approve, auto-reject, alert requestor, assign approver, trigger external process, or stop processing actions.

10. The at least one computer-readable medium of claim 8, wherein the at least one condition includes at least one of an amount of the requested purchase, a description of the requested purchase, a category of item or service requested, an identity of the user, a recurrence or non-recurrence of the request, a requested method of payment, or an account from which funds are requested.

11. The at least one computer-readable medium of claim 8, wherein the purchasing system includes a virtual bot that receives the message, and wherein the instructions cause the computing system to receive the message and provide the digital credit object via a collaboration tool.

12. The at least one computer-readable medium of claim 8, wherein the instructions further cause the computing system to:
generate an entry in a purchase order database that includes information about the provided digital credit object and the identified set of rules.

13. The at least one computer-readable medium of claim 8, wherein the provided digital credit object is a virtual credit card, a virtual prepaid card, an amount of digital currency or cryptocurrency, or a purchase order.

14. The at least one computer-readable medium of claim 8, wherein identifying the set of rules applicable to the purchase order object is further based, at least in part, on contextual information associated with the purchase request message.

15. A computing system, comprising:
at least one hardware processor; and
at least one memory carrying instructions that, when executed by the at least one processor, causes the computing system to perform operations comprising:
receive a set of rules to apply to a purchase order object;
change an order in which the set of rules are applied based on a dragging and dropping operation to re-order at least one rule in the set of rules;
receive, at a purchasing system of an organization, a purchase request message from a user associated with the organization;
extract, by the purchasing system, purchase order information from the purchase request message,
wherein the purchase order information is associated with a request from the user to make a purchase;
generate, by the purchasing system, the purchase order object using the extracted purchase order information;
identify, based at least in part on the purchase order information, the set of rules applicable to the purchase order object,
wherein each rule in the set of rules is associated with at least one condition that, when present, causes the rule to be applied, and
wherein each rule in the set of rules is associated with at least one action applied to the purchase order object when the rule is applied;
apply, to the purchase order object and for each rule in the identified set of rules, the at least one action,
wherein the at least one action includes sending the purchase order object to an approval entity;
upon receiving authorization from each approval entity, generate, by the purchasing system, a digital credit object configured to allow the user to make the purchase,
wherein the digital credit object is configured with metadata about the set of rules applicable to the purchase order object; and
provide, by the purchasing system, the digital credit object to the user, for the user to make the purchase.

16. The computing system of claim 15, wherein the at least one action includes at least one of auto-approve, auto-reject, alert requestor, assign approver, trigger external process, or stop processing actions.

17. The computing system of claim 15, wherein the at least one condition includes at least one of an amount of the requested purchase, a description of the requested purchase, a category of item or service requested, an identity of the user, a recurrence or non-recurrence of the request, a requested method of payment, or an account from which funds are requested.

18. The computing system of claim 15, wherein the purchasing system includes a virtual bot that receives the message, and wherein the instructions cause the computing system to receive the message and provide the digital credit object via a collaboration tool.

19. The computing system of claim 15, wherein the instructions further cause the computing system to:
generate an entry in a purchase order database that includes information about the provided digital credit object and the identified set of rules.

20. The computing system of claim 15, wherein the provided digital credit object is a virtual credit card, a virtual prepaid card, an amount of digital currency or cryptocurrency, or a purchase order.

* * * * *